(12) United States Patent
Chen

(10) Patent No.: US 9,569,956 B1
(45) Date of Patent: Feb. 14, 2017

(54) REMOTE MONITORING AND CONTROL SYSTEM AND METHOD

(71) Applicant: DA-YEH UNIVERSITY, Changhua County (TW)

(72) Inventor: Iong Zong Chen, Changhua County (TW)

(73) Assignee: DA-YEH UNIVERSITY, Changhua County (TW)

( * ) Notice: Subject to any disclaimer, the term of this patent is extended or adjusted under 35 U.S.C. 154(b) by 0 days.

(21) Appl. No.: 14/883,647

(22) Filed: Oct. 15, 2015

(51) Int. Cl.
*G08C 17/02* (2006.01)
*G08C 25/00* (2006.01)

(52) U.S. Cl.
CPC .............. *G08C 17/02* (2013.01); *G08C 25/00* (2013.01); *G08C 2201/50* (2013.01)

(58) Field of Classification Search
CPC ......... G05B 15/02; G05B 19/02; G05B 19/05; H04L 12/2814; F24F 11/00; F24F 11/006; F24F 11/0012; G08C 17/02; G08C 25/00; G08C 2201/50; G08C 23/04

USPC ..... 340/3.1, 6.1, 12.52, 572.2, 539.1, 572.3; 700/276

See application file for complete search history.

(56) References Cited

U.S. PATENT DOCUMENTS

| 9,080,782 B1* | 7/2015 | Sheikh ..................... F24F 11/00 |
| 2012/0161928 A1* | 6/2012 | Cheng .................... G05B 15/02 340/6.1 |
| 2015/0219352 A1* | 8/2015 | Kobayashi ............ F24F 5/0096 700/276 |

* cited by examiner

*Primary Examiner* — Ali Neyzari
(74) *Attorney, Agent, or Firm* — Leong C. Lei

(57) ABSTRACT

The remote monitoring and control system contains at least a control device, a server device, and a mobile device. The control device periodically collects status/environmental data and delivers these data to the mobile device via the server device. An operator can set up control data on the mobile device. The server device automatically converts the control data set by the operator into appropriate control command by a conversion table corresponding to a specific control device. Therefore, the present invention achieves the goal of using a single mobile device to control multiple devices without mistakenly issuing a false command to a wrong device.

10 Claims, 6 Drawing Sheets

REMOTE MONITORING AND CONTROL SYSTEM AND METHOD

BACKGROUND OF THE INVENTION (a) Technical Field of the Invention

The present invention is generally related to remote monitoring and control, and more particular to a remote monitoring system and a related method through a cloud server.

(b) Description of the Prior Art

Existing remote monitoring and control system is usually integrated with the controlled device such as an air conditioner so that the monitor and control system is able to monitor the controlled device's status. In addition, the control of the controlled device is also integrated with the controlled device and usually can be operated remotely. However, such remote control is usually limited by distance. When the remote monitoring and control system is too far away from the controlled device, remote control cannot be achieved.

Furthermore, the remote monitoring and control system is often designed for a specific controlled device. When there are multiple controlled devices, multiple remote monitoring and control systems are required, causing operational inconvenience and sometimes erroneous condition. For example, an operation is aimed for a first controlled device, yet both the first controlled device and a second controlled device are affected.

As described above, the operational inconvenience and erroneous condition for multiple controlled devices require further improvement in the remote monitoring and control system.

SUMMARY OF THE INVENTION

A novel remote monitoring and control system and a related method is provided so as to obviate the shortcomings of the prior art.

The remote monitoring and control system contains at least a control device, a server device, and a mobile device. Each control device contains a reception module, a transmission module, a processing module, a detection module, and an interface module. The server device contains a server communication module, a server reception module, a server transmission module, and a conversion module. The mobile device contains a mobile communication module, a mobile reception module, and a display module.

In each control device, the reception module is for receiving a control command and periodically collecting a status data. The processing module is for executing the control command. The detection module is for collecting an environmental data. The transmission module is for transmitting the status/environmental data. The interface module is for decoding and transmitting the environmental data to the transmission module.

In the server device, the server communication module is for communicating with the control device which receives the status/environmental data from the transmission module and transmits the control command to the reception module. The server reception module is for receiving a control data. The conversion module is for converting the control data to the control command according to a conversion table and the status/environmental data. The server transmission module is for transmitting the status/environmental data.

In the mobile device, the mobile communication module is for communicating with the server device which receives the status/environmental data from the server transmission module and transmits the control data to the server reception module. The mobile reception module is for receiving the control data. The display module is for presenting the status/environmental data.

The remote monitoring and control method contains the following steps.

Firstly, a control device periodically collects status/environmental data. Then a server communicates with the control device and receives the status/environmental data from the control device. Then a mobile device communicates with the server device, receives the status/environmental data from the server device, and presents the status/environmental data. Subsequently, the mobile device receives a control data and transmits the control data to the server device. Then, the server device converts the control data to a control command according to a conversion table and the status/environmental data. Then, the server device transmits the control command to the control device Finally, the control device executes the control command.

In contrast to the prior art, the server device can collect status/environmental data from multiple control devices and an operator can directly control these control devices on the mobile device altogether. The server device automatically converts the control data set by the operator into appropriate control command by a conversion table corresponding to a specific control device. Therefore, the present invention achieves the goal of using a single mobile device to control multiple devices without mistakenly issuing a false command to a wrong device. The operational convenience is greatly enhanced.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
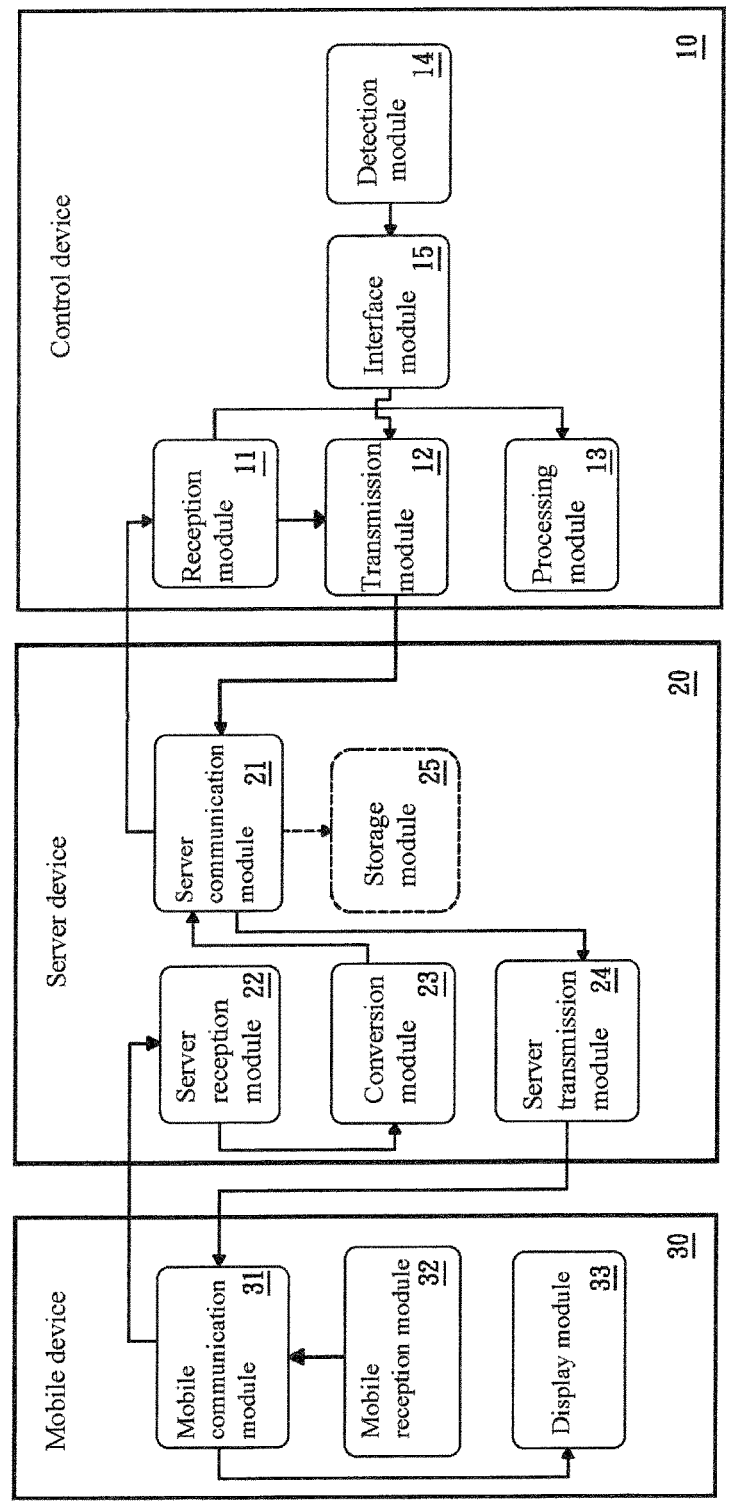
FIG. 1 is a functional block diagram showing a remote monitoring and control system according to an embodiment of the present invention.

As shown in FIG. 1, a remote monitoring and control system according to an embodiment of the present invention contains at least a control device 10, a server device 20, and a mobile device 30. The control device 10 in turn contains a reception module 11, a transmission module 12, a processing module 13, a detection module 14, and an interface module 15. The server device 20 contains a server communication module 21, a server reception module 22, a conversion module 23, and a server transmission module 24. The mobile device 30 contains a mobile communication module 31, a mobile reception module 32, and a display module 33.

The control device 10 itself can be an ordinary electronic device or apparatus that is under control, such as an air conditioner, a computer, a machine tool, an electrical generator, etc. The control device 10 can also be an electronic control system controlling other devices in a specific environment, such as an electronic control system in a factory, in a household, in a greenhouse, etc.

A function of the reception module 11 of the control device 10 is to collect various input data periodically. If the control device 10 is itself a device under control, the input data mainly contain its status data. For example, if the control device 10 is an air conditioner, the input data may include the currently set temperature, currently set humidity, and fan direction, etc. of the air conditioner. If the control device 10 is an electrical generator, the input data may include the volume of generated power, the volume of electricity storage, generation efficiency, the volume of reserved electricity, etc. of the electrical generator. If the control device 10 is an electronic control system controlling other devices in a specific environment, the input data contain status data from the controlled devices and environmental data detected from the environment as well. For example, if the control device 10 is an electronic control system for a factory, the input data may include status data from all devices in the factory, temperature of the factory, humidity of the factory, pressure of the factory, etc. As another example, if the control device is an electronic control system for a greenhouse, the input data may include temperature, humidity, illumination, and ventilating air volume, etc. of the greenhouse.

Additionally, the detection module 14 can also collect various other input data not available from the reception module 11 such as temperature, humidity, illumination, brain wave, etc.

The interface module 15 decodes the input data collected by the detection module 14, and provides the decoded input data to the transmission module 12.

The transmission module 12 delivers the input data from the reception module 11 and from the detection module 14 to the server device 20 The server device 20 is usually an ordinary server that communicates with the control device 10 by the server communication module 21 in a wireless manner, which can be wireless LAN, ZigBee, RF transmission, Bluetooth, WIFI, Global System for Mobile Communications (GSM), General Packet Radio Service (GPRS), 3rd-generation (3G) mobile communication, Worldwide Interoperability for Microwave Access (WiMAX), etc.

The server communication module 21 periodically receives status data and/or environmental data from the transmission module 12, and the server transmission module 24 relays these data from the server communication module 21 to the mobile device 30. The mobile device 30 can be a Personal Digital Assistant (PDA), a hand-held device (e.g., cellular phone, smart phone, etc.), a notebook computer, a tablet computer, etc.

The mobile device 30 communicates with the server device 20 by the mobile communication module 31 in a wireless manner, which can be wireless LAN, ZigBee, RF transmission, Bluetooth, WIFI, Global System for Mobile Communications (GSM), General Packet Radio Service (GPRS), 3rd-generation (3G) mobile communication, Worldwide Interoperability for Microwave Access (WiMAX), etc.

The mobile communication module 31 periodically receives various data from the server transmission module 23, and the display module 33 presents these data from the server communication module 31 on the mobile device 30 to an operator. The operator then can learn the current condition of the control device 10 through the presented data.

The operator can configure control data through a user interface of the server reception module 32, and the control data is delivered to the server device 20 through the server communication module 31. The control data can be a temperature setting with related parameter, an ON/OFF setting, a humidity setting with related parameter, a voltage setting, a charge setting, a discharge setting, a direction setting, an illumination setting with related parameter, etc.

The server reception module 22 receives the control data form the mobile communication module 31, the control data is converted to a control command by the conversion module 23 using a conversion table and the received status/environmental data. The conversion table contains multiple conversion records, each containing control data, and control command.

For example, a conversion record may contain control data as "humidity setting" with related parameter "25%-30%" and control command as "turning on humidifying function and turning off dehumidifying function," another record may contain control data as "humidity setting" with related parameter "25%-30%" and control command as "turning off humidifying function and turning on dehumidifying function," and another record may contain control data as "humidity setting" with related parameter "25%-30%" and control command as "turning off both humidifying and dehumidifying functions."

If the received current status/environmental data is "humidity 35%" and the control data received from the mobile reception module 22 is "humidity setting" with related parameter "25%-30%," the conversion module 23 obtains the control command "turning off humidifying function and turning on dehumidifying function" since the current humidity 35% exceeds the control data's related parameter "25%-30%."

If the received current status/environmental data is "humidity 20%" and the control data received from the mobile reception module 22 is "humidity setting" with related parameter "25%-30%," the conversion module 23 obtains the control command "turning on humidifying function and turning off dehumidifying function" since the current humidity 20% is below the control data's related parameter "25%-30%."If the received current status/environmental data is "humidity 27%" and the control data received from the mobile reception module 22 is "humidity setting" with related parameter "25%-30%," the conversion module 23 obtains the control command "turning off both humidifying and dehumidifying functions" since the current humidity 27% conforms the control data's related parameter "25%-30%."

After the control data is converted to a control command by the conversion module 23, the control command is delivered to the control device 10 by the server communication module 21. The control device 10 receives the control command through the reception module 11, and the control command is passed to the processing module 13 for execution.

Following the examples above, if the control command is "turning off humidifying function and turning on dehumidifying function," the processing module 13 will then turns on a humidifier and turns off a dehumidifier in the control device 10 or controlled by the device 10. Similarly, if the control command is "turning on humidifying function and turning off dehumidifying function" or "turning off both humidifying and dehumidifying functions," the processing module 13 will perform the specified operation accordingly.

As such, the operator can directly control the control device 30 through the mobile device 30 at any time, or the can directly control the control device 30 after learning the current condition of the control device 10 from the mobile device 30.

The server device 20 further contains a storage module 25 for storing the status/environmental data received from the control device 10 via the transmission module 12 and the server communication module 21. The operator therefore can obtain a history of the control device 10's current condition from the status/environmental data stored in the server device 20, retrieved by the mobile communication module 31, and presented by the display module 33.

Figure 2:
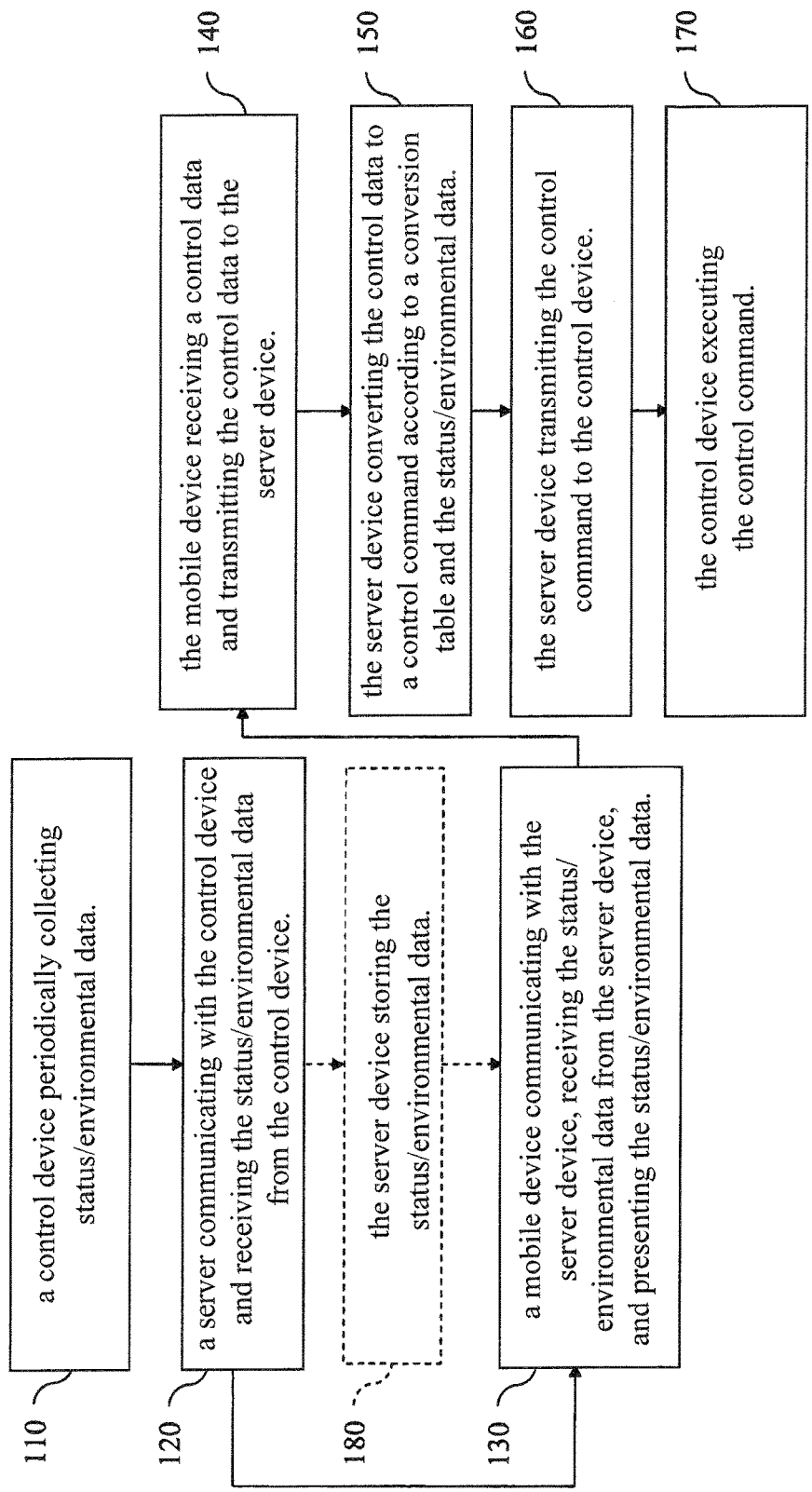
FIG. 2 is a flow diagram showing the steps of a remote monitoring and control method according to an embodiment of the present invention.

Additional description is given below, along with FIGS. 1 and 2.

Figure 3:
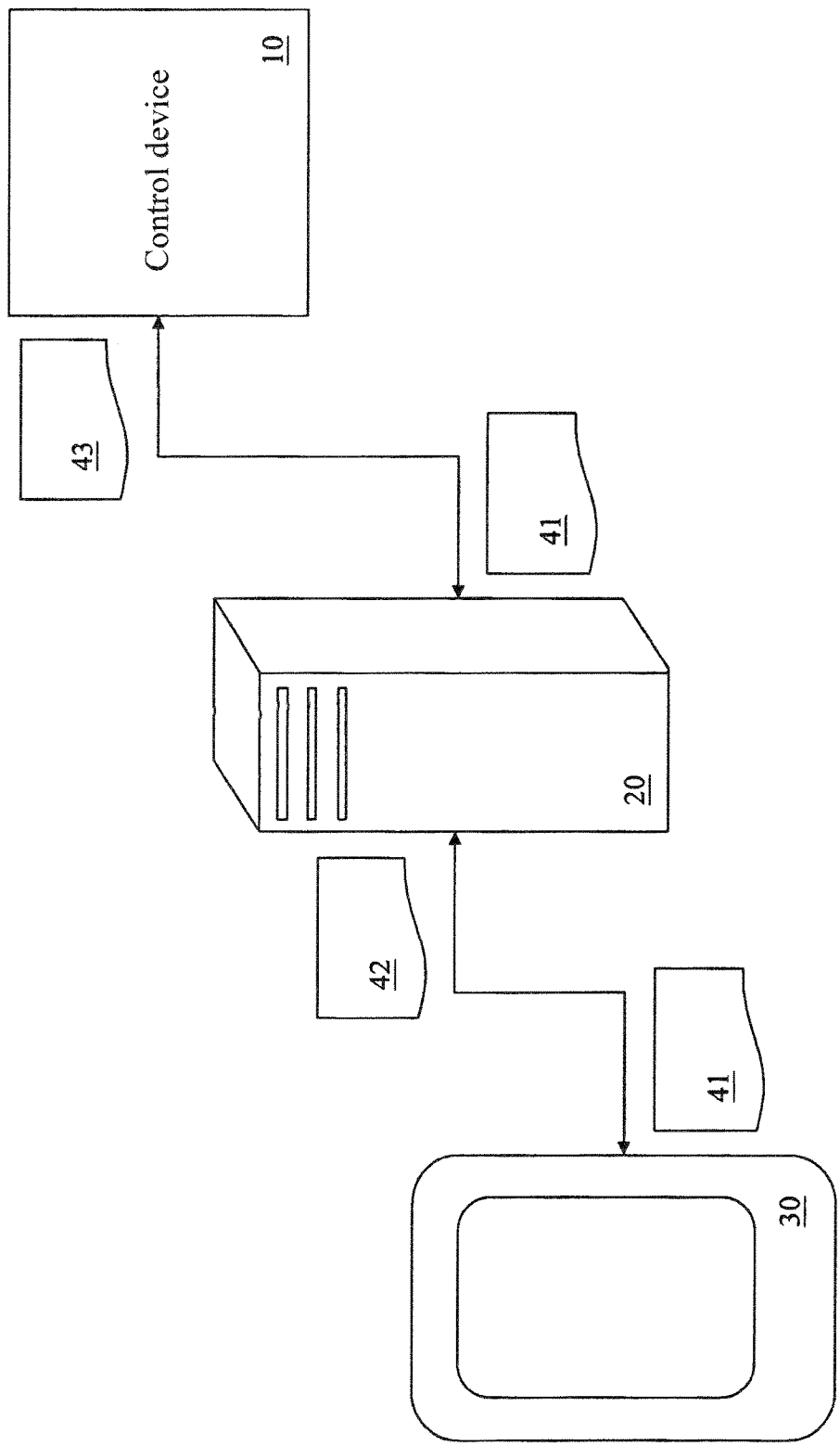
FIG. 3 is a schematic diagram showing an application scenario of the remote monitoring and control system of FIG. 1.

In an example as shown in FIG. 3, the control device 10 is an air conditioner and status/environmental data 41 collected by the reception module are "room temperature: 27 degree, humidity: 35%, fan direction: fixed" (step 110).

Then, the server communication module 21 of the server device 20 establishes a link with the control device 10 over a wireless LAN. The server communication module 21 receives the status/environmental data 41 from the transmission module 11 (step 120). The status/environmental data 41 is saved by the storage module 25 (step 180).

Figure 4A:
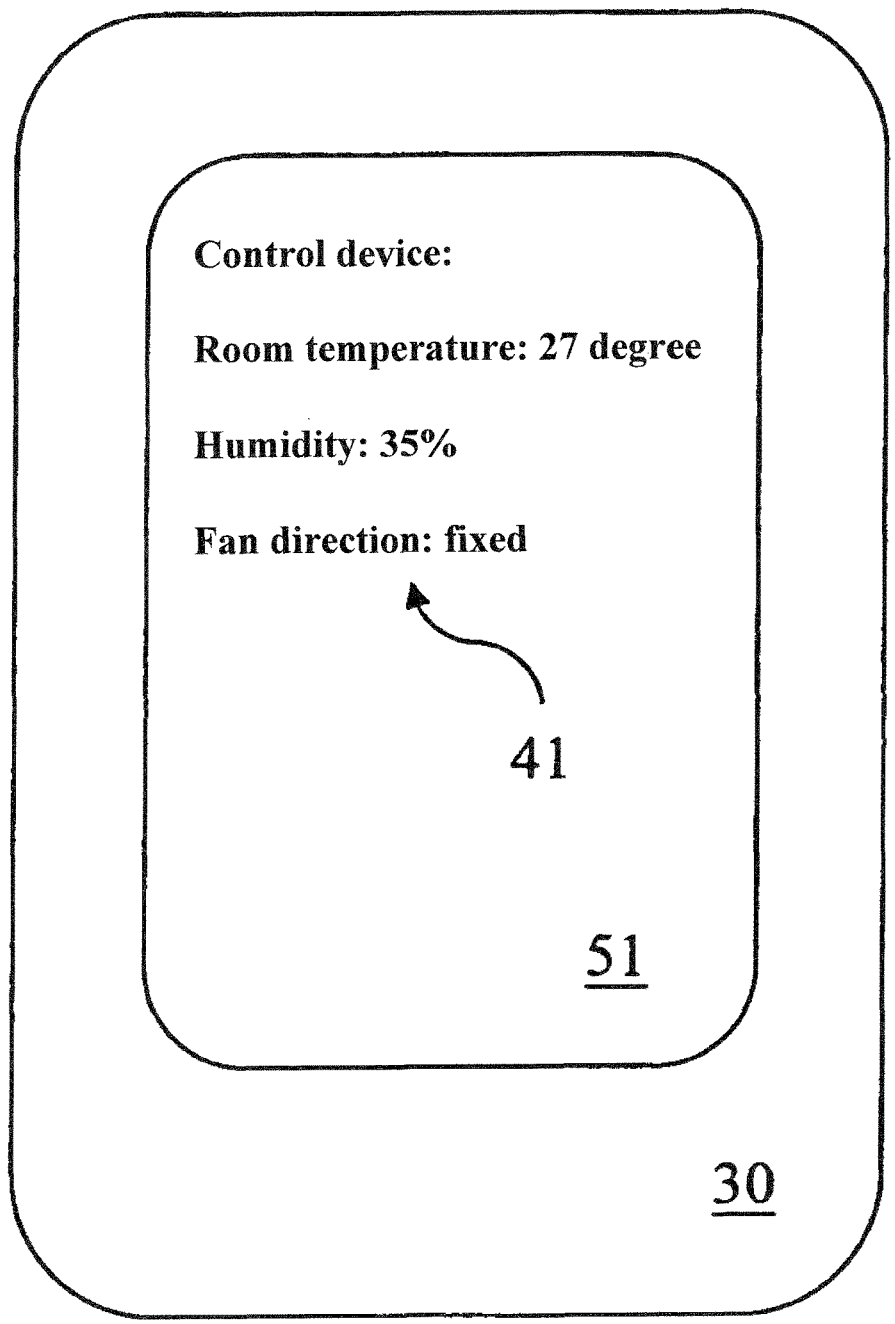
FIG. 4A is a schematic diagram showing status/environmental data presented on a mobile device of the remote monitoring and control system of FIG. 1.

When the mobile communication module 31 of the mobile device 30 establishes a link with the server device 20 through WIFI, the mobile communication module 31 receives the status/environmental data 41 from the server transmission module 24, and the status/environmental data 41 is presented to an operator through the display module 33 (step 130) as shown in FIG. 4A. The operator therefore can learn the current condition of the control device 10 at any time.

Figure 4B:
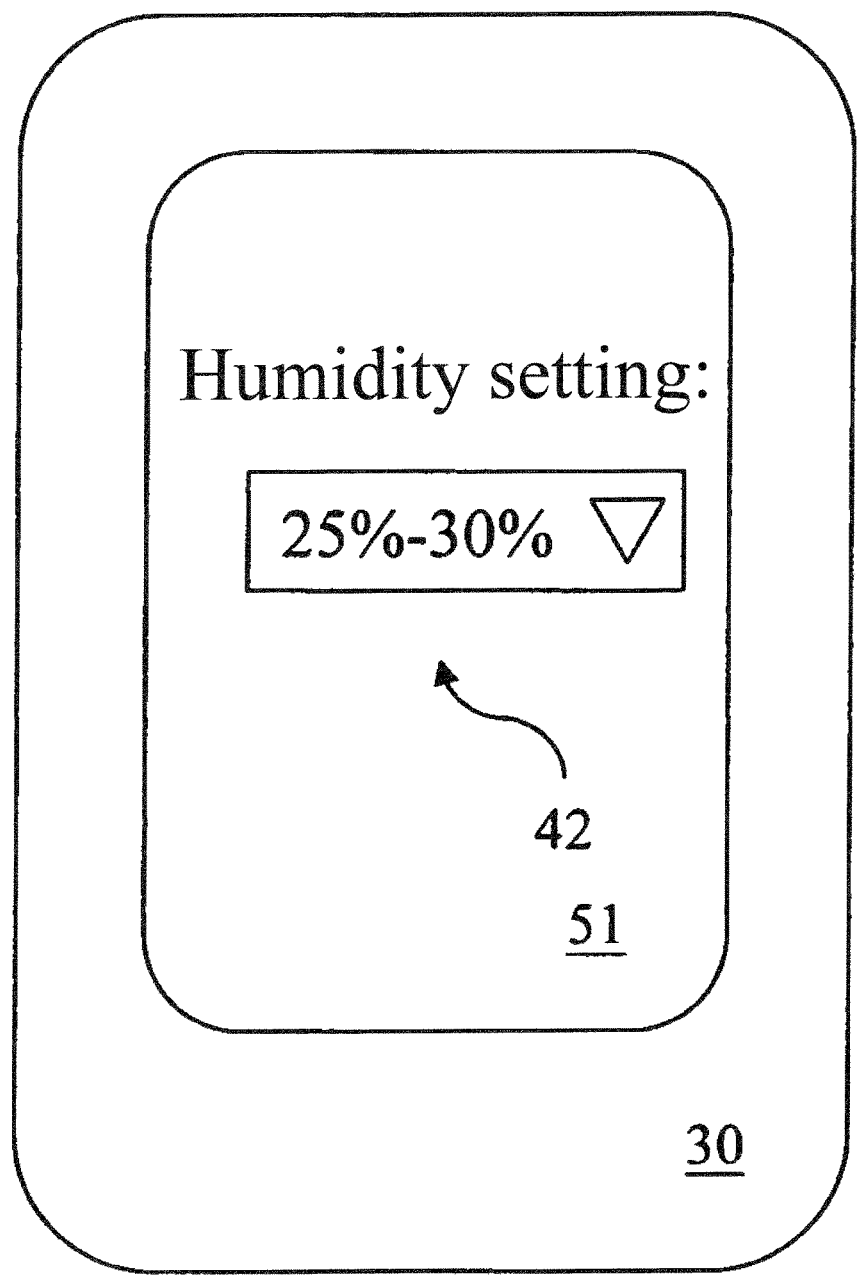
FIG. 4B is a schematic diagram showing a user interface on a mobile device of the remote monitoring and control system of FIG. 1.

Then, as shown in FIGS. 3 and 4B, the operator, through a user interface 51 of the mobile device 30, configure a parameter "25%-30%" for a humidity setting, thereby setting up a control data 42 as "humidity setting" with related parameter "25%-30%." The mobile device 30 receives the control data 42 through the mobile reception module 32 and the control data 42 is delivered to the server device 20 by the mobile communication module 31 (step 140)

Figure 5:
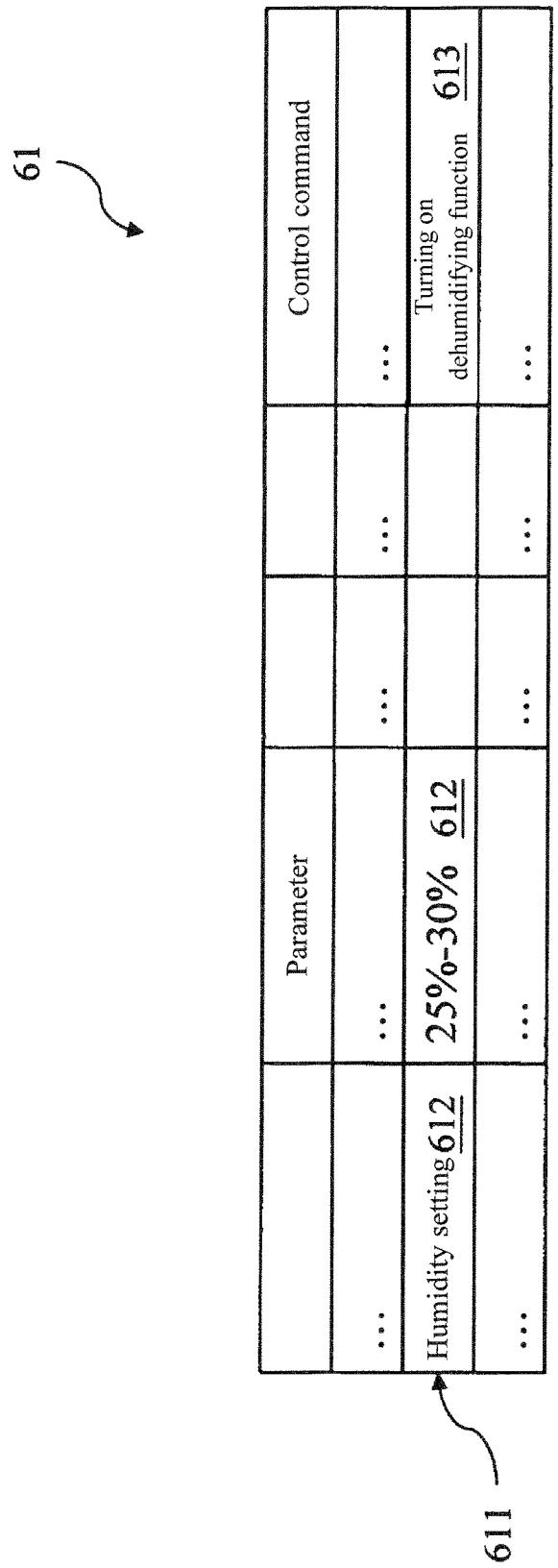
FIG. 5 is a schematic diagram showing a conversion table employed by the remote monitoring and control system of FIG. 1.

As shown in FIGS. 3 and 5, the server reception module 22 receives the control data 42 from the mobile communication module 31, the conversion module 23 converts the control data 42 into a control command 43 "turning on dehumidifying function" by consulting a conversion table 61. The conversion table 61 has a conversion record 611 specifying its control data 612 as "humidity setting" with related parameter "25%-30%" and its control command 613 as "turning on dehumidifying function." As the status/environment data 41 specifies "room temperature: 27 degree, humidity: 35%, fan direction: fixed," the humidity 35% has exceeded the parameter "25%-30%" and the conversion module 23 therefore sets the control command 43 to be "turning on dehumidifying function" in accordance with the control command 613.

As shown in FIG. 3, after the conversion module 23 obtains the control command 43 by consulting the conversion table 61, the server communication module 21 transmits the control command 43 to the control device 10 (step 160). After receiving the control command 43, the processing module 13 of the control device 10 executes the control command 43 by turning on the air conditioner's dehumidifying function (step 170).

As described, the operator is able to learn the current condition of the control device 10 and performs control via the mobile device 30 to the control device 10 at any time, or the operator can manage and control the control device 10 directly via the mobile device 30.

The operator can also obtain the status/environmental data 41 stored in the server device 20 through the mobile communication module 31 of the mobile device 30, and observe a history of control device 10's condition through the display module 33, so as to aid the operator's control decision.

As described above, the control device 10 can collect various device status data from itself, and/or environmental data from the detection module 14, and transmits these data to the mobile device 30 via the server device 20. The operator therefore can conduct accurate control to the control device 10.

The control device 10 can also be integrated in a specific environment such as a green house, a field, a space, etc. The operation principle and process is no different.

In contrast to the prior art, the server device 20 can collect status/environmental data from multiple control devices 10 and the operator can directly control these control devices 10 on the mobile device 30 altogether. The server device 20 automatically converts the control data set by the operator into appropriate control command by a conversion table corresponding to a specific control device 10. Therefore, the present invention achieves the goal of using a single mobile device to control multiple devices without mistakenly issuing a false command to a wrong device. The operational convenience is greatly enhanced.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A remote monitoring and control system, comprising:
    at least a control device, each comprising a reception module for receiving a control command and periodically collecting a status data, a processing module for executing the control command, a detection module for collecting an environmental data, a transmission module for transmitting status/environmental data, and an interface module for decoding and transmitting the environmental data to the transmission module;
    a server device comprising a server communication module for communicating with the control device which receives the status/environmental data from the transmission module and transmits the control command to the reception module, a server reception module for receiving a control data, a conversion module for converting the control data to the control command according to a conversion table and the status/environmental data, and a server transmission module for transmitting the status/environmental data; and
    a mobile device comprising a mobile communication module for communicating with the server device which receives the status/environmental data from the server transmission module and transmits the control data to the server reception module, a mobile reception module for receiving the control data, and a display module for presenting the status/environmental data.

2. The remote monitoring and control system according to claim 1, wherein the server device further comprises a storage module for storing the status/environmental data.

3. The remote monitoring and control system according to claim 1, wherein the server communication module communicates with the control device in a wireless manner, which is one of wireless LAN, ZigBee, RF transmission, Bluetooth, WIFI, Global System for Mobile Communications (GSM), General Packet Radio Service (GPRS), 3rd-generation (3G) mobile communication, and Worldwide Interoperability for Microwave Access (WiMAX).

4. The remote monitoring and control system according to claim 1, wherein the mobile communication module communicates with the server device in a wireless manner, which is one of wireless LAN, ZigBee, RF transmission, Bluetooth, WIFI, Global System for Mobile Communications (GSM), General Packet Radio Service (GPRS), 3rd-generation (3G) mobile communication, and Worldwide Interoperability for Microwave Access (WiMAX).

5. The remote monitoring and control system according to claim 1, wherein the conversion table comprises a plurality of conversion records; and each conversion record comprises a control data and a control command.

6. A remote monitoring and control method, comprising the steps of:
    a control device periodically collecting status/environmental data;
    a server communicating with the control device and receiving the status/environmental data from the control device;
    a mobile device communicating with a server device, receiving the status/environmental data from the server device, and presenting the status/environmental data;
    the mobile device receiving a control data and transmitting the control data to the server device;
    the server device converting the control data to a control command according to a conversion table and the status/environmental data;
    the server device transmitting the control command to the control device; and the control device executing the control command.

7. The remote monitoring and control method according to claim 6, further comprising the step of the server device storing the status/environmental data.

8. The remote monitoring and control method according to claim 6, wherein the server device communicates with the control device in a wireless manner, which is one of wireless LAN, ZigBee, RF transmission, Bluetooth, WIFI, Global System for Mobile Communications (GSM), General Packet Radio Service (GPRS), 3rd-generation (3G) mobile communication, and Worldwide Interoperability for Microwave Access (WiMAX).

9. The remote monitoring and control method according to claim 6, wherein the mobile device communicates with the server device in a wireless manner, which is one of wireless LAN, ZigBee, RF transmission, Bluetooth, WIFI, Global System for Mobile Communications (GSM), General Packet Radio Service (GPRS), 3rd-generation (3G) mobile communication, and Worldwide Interoperability for Microwave Access (WiMAX).

10. The remote monitoring and control method according to claim 6, wherein the conversion table comprises a plurality of conversion records; and each conversion record comprises a control data and a control command.

* * * * *